UNITED STATES PATENT OFFICE.

SIGMUND LUFT, OF MAYWOOD, ILLINOIS.

FOOD PRODUCT.

1,420,661. Specification of Letters Patent. Patented June 27, 1922

No Drawing. Application filed January 8, 1921. Serial No. 435,949.

*To all whom it may concern:*

Be it known that I, SIGMUND LUFT, a citizen of the United States, residing at Maywood, in the county of Cook and State of Illinois, have invented certain new and useful Improvements in Food Products, of which the following is a specification.

This invention relates to new and useful improvements in prepared, quick cooking foods, and more particularly to food products produced from starchy materials in granular or whole form.

In the treatment of grain by the ordinary milling processes, a large percentage of broken grain results, which has had no special value as a human food product. An example may be noted in what might, not improperly, be called a by-product resulting from the milling of rice, known as "brewers' rice." Heretofore substantially this entire product was used, as its name implies, by brewers in the manufacture of liquor, but with the institution of prohibition, this product has lost its usefulness and value. My process makes from this and other valueless broken grains a food product entirely suitable for human use. Other starchy materials that have likewise had their uses discontinued and from which my process will make excellent human foods, are barley used in the malting industry and corn starches used in the distilling industry. My process will also render into human foods such grains of inferior quality as overripe or immature wheats, or such grains as emmer, milo, etc., which have as yet not been used to any appreciable extent for human foods. While my process is primarily concerned for adaptation to starchy materials of the above mentioned kinds, it can be used with all starchy materials to create a useful, wholesome and palatable food.

One of the objects of my invention, therefore, is to so treat starchy materials as to convert them from a practically useless or less valuable product to a useful food for human consumption.

Another object of my invention is to produce a palatable food which will be relatively cheap; a product which will emit a sweet roast flavor, possess the desired elements of nutrition, and which, when cooked in boiling water for a brief period, may be eaten with milk or cream as a breakfast food, or be eaten as a substitute for potatoes, noodles, spaghetti and the like when the product is in mush form; and which is also adapted to be made into muffins, pancakes or puddings.

Another object of my invention is to produce a food that will require a minimum amount of cooking in the kitchen and will be in condition to be eaten when treated with water for about three minutes.

A still further object of the invention is to produce a food product from starchy material, characterized by the fact that the individual granules, when cooked in the kitchen for use, will be tender and palatable, which will cook up evenly and not become a pasty mass,—this latter result being due to two steps in my process, namely: the "curing" and steam treatment steps. These steps of my process result in an even preparation of the individual granules though they may be, as in the case of "brewers' rice", of uneven shapes and sizes.

These and other advantages of the invention will more fully appear as I proceed with this specification.

The steps of my process will naturally be varied according to the kind of starchy material being treated, but the best results will be obtained when the following process is carried out. I take a quantity of starchy material, such for example as "brewers' rice", and add thereto between thirty to fifty per cent of water, by weight; that is to say, to 100 pounds of rice, I add 30 to 50 pounds of water. In this water I preferably dissolve a quantity of salt equal to about one per cent by weight of the quantity of rice to be treated, though, manifestly, the salt may be omitted. I next pour the salted water slowly into the container of the rice, stirring constantly, so that all the granules of rice receive some water. At intervals of about five minutes, continuous throughout a period of from one to two hours, I stir or agitate the rice after adding the water to the rice. Having then completely soaked the rice, I place the mixture in an air tight compartment and allow it to "cure" for a varied period depending upon the starchy material used. I allow the entire mass of rice and its absorbed salt water to remain in the air tight compartment as a compact unit a sufficient length of time to equalize the water content of each granule and in the case of "brewers' rice" under explanation, two hours is the most desirable time. The granules will lie one upon another and it is found that those granules (usually the larger ones) having initially received less moisture, proportionally, than the smaller ones, will draw moisture from the outside of the saturated granules and thus become evenly saturated. Thus the moisture content of all the granules is equalized.

The process of "curing" just described has equalized the quantity of water contained by each granule, but within the individual granule there has not been an even distribution of its water content throughout its cellular structure. It is found that each granule has not had its water content diffused to its center, and it is highly necessary to obtain this diffusion in order to receive an even action throughout the later step of this process. In order to drive the water which has soaked into each granule to its center, I steam treat the cured mass of granules as follows:

I wrap the cured rice in a loosely woven cloth bag or I may place it upon a perforated or sieve plate, in either case hanging the bag or plate within the center of a steamer having a fixed, tight cover, the vessel being suited to withstand low pressures. I admit steam to this vessel in any suitable manner, either directly or by boiling water in the bottom thereof, taking care not to create a pressure of more than about five pounds within the vessel. I maintain the cured product at this low pressure within said vessel for a period of about thirty minutes, and by this treatment, at the pressure and for the time stated, I bring the rice to a point short of initial gelatinization. If gelatinization takes place and the material is subjected to the following steps of my process, a bad odor and taste will result and the product becomes unpalatable. I therefore avoid any gelatinization and I stop the steam treatment at a point short of initial gelatinization. This latter step also enlarges the cells of the starch and softens the starch, both of which steps assist in producing the even action of the following step.

I next apply a roasting process to the steam treated rice, which now has its water content evenly diffused. Since in the roasting action, elimination of water is necessary before the true roasting action can take place, the water content of each granule in its efforts to free itself from its containing granule, reacts with it under the heat of roasting and becomes an assisting step in the cooking of the granules by the roasting heat. Since we have an even diffusion of the water content throughout each granule and since the latter's starch cells are enlarged and soft, we are able to obtain a uniform action in the roast step of the process and to produce an even product.

I next place the material in a roasting vessel of any suitable type, having first heated the roasting vessel to any temperature of from 120° to 150° F. I gradually raise the temperature of the rice in the roaster to about 300° F. and maintain this temperature for a period varying from five to fifteen minutes, although in the case of brewers' rice, I find that ten minutes is sufficient. The dry heat of this roasting step eradicates the water in the cells of the starchy material and the water during its elimination assists in cooking each granule. The best results are obtained with respect to the roasting step by agitating the mass while being roasted, but very good results will follow when the roasting is accomplished without agitation, as in a baking apparatus.

After the roasting treatment, the product is allowed to cool and may then be placed in containers ready for use.

It may be desirable, in some instances, to season to taste by adding a saccharine or other seasoning substance. I have found it desirable to reduce the temperature of the product after the roasting step has been completed, to from 300° F. to about 180° F., and then to add the saccharine and the seasoning substances in the order named. The mixing step just disclosed should not take more than a few minutes, since if maintained for a longer time the saccharine and seasoning will have become weakened and slightly altered in taste. After mixing, the product is allowed to cool and is placed in containers for use.

The finished product prepared in accordance with the process just described, may be very quickly prepared for consumption by pouring a desired amount thereof into boiling water and cooking for about three minutes. No stirring or agitating is required. The boiled water is quickly and evenly absorbed throughout the entire mass by reason of the results of the curing, steam treating and roasting steps of my process. The product thus prepared in the kitchen will have individually soft and no hard granules, will emit a sweet roast flavor, when unseasoned, and will be found to be palatable and nourishing.

The product thus prepared by my process will possess an orange color; the individual granules will be soft, nontransparent particles, exhibiting no degree of gelatinization or total caramelization; and the mass when prepared for eating will have the consistency of a mush without the characteristics of a paste, and will emit a pleasant roast flavor when unseasoned, and a blended roast and seasoning flavor if seasoning is used. Seasoning to taste may be added, as described, in either solid or liquid form. The product made from brewers' rice will also be characterized by resulting in a mass of individual, irregularly shaped and irregularly sized granules which by the use of my process have been rendered uniformly soft and tender.

I claim as my invention:

1. The process of producing a food product which consists in adding a granular or whole starchy material to a quantity of water, agitating the while, curing the starchy material, subjecting the mixture to heat at a low pressure and maintaining the same to a point short of initial gelatinization and finally roasting the starchy material.

2. A process of producing a food product which consists in adding water to a granular or whole starchy material, curing the starchy material, subjecting the mixture to low pressure steam treatment and finally applying a roasting treatment to the starchy material.

3. A process of conditioning and precooking a granular or whole starchy food product which consists in causing an equal, even and thorough diffusion of water throughout the granular or whole starchy material and then applying a dry heat roast treatment, whereby a wet cooking in the process of evaporation of the contained water and a dry cooking in the process of dextrinization of the starchy material is effected.

4. The process of rendering a mass of unevenly sized, starchy material in a condition for cooking up quickly to an evenly cooked mush by subjecting the starchy material to a water absorption treatment and then effecting a double cooking by roasting in the evaporation of the absorbed water followed by a dextrinization of the starchy materials, substantially as described.

5. The process of preparing a food product which consists in subjecting a granular or whole starchy material to a water absorption treatment consisting of soaking, curing and steam treating at low pressure and then effecting a double cooking by the dry heat of roasting in the evaporation of the absorbed water and subsequent dextrinization of the starchy material.

6. A food product comprising a mass of nontransparent, dextrinized, loose, individual parts of granular or whole starchy material.

7. A food product comprising granular or whole starchy material so modified as to cook up quickly and evenly into a mush in boiling water without the formation of a paste and exhibiting in the mass the individual parts of which it was formed.

8. A food product comprising modified granular or whole starchy material upon which no gelatinized structure is visible.

9. A food product from granular or whole starchy material possessing a change in color from the original and no part of which exhibits total caramelization.

10. A food product from granular or whole starchy material so modified that the granular or whole starchy material will cook up quickly and evenly without necessitating stirring of the particles to prevent lumping at any point throughout the mush.

In testimony that I claim the foregoing as my invention I affix my signature, in the presence of two witnesses, this 25th day of December, 1920.

SIGMUND LUFT.

Witnesses:
 TAYLOR E. BROWN,
 B. L. MACGREGOR.